(12) United States Patent
Houten

(10) Patent No.: US 9,506,007 B2
(45) Date of Patent: Nov. 29, 2016

(54) LOW SULFUR MARINE DISTILLATE FUEL TRUNK PISTON ENGINE OIL COMPOSITION

(71) Applicant: Wilhelmus Petrus Antonie Van Houten, Prinsenbeek (NL)

(72) Inventor: Wilhelmus Petrus Antonie Van Houten, Prinsenbeek (NL)

(73) Assignee: Chevron Oronite Technology B.V. (NL)

( * ) Notice: Subject to any disclaimer, the term of this patent is extended or adjusted under 35 U.S.C. 154(b) by 99 days.

(21) Appl. No.: 14/541,959

(22) Filed: Nov. 14, 2014

(65) Prior Publication Data

US 2016/0137949 A1     May 19, 2016

(51) Int. Cl.
| | | |
|---|---|---|
| *C10M 141/06* | (2006.01) | |
| *F02B 43/02* | (2006.01) | |
| *C10M 159/22* | (2006.01) | |

(52) U.S. Cl.
CPC ......... *C10M 141/06* (2013.01); *C10M 159/22* (2013.01); *F02B 43/02* (2013.01); *C10M 2203/1025* (2013.01); *C10M 2203/1045* (2013.01); *C10M 2207/028* (2013.01); *C10M 2207/262* (2013.01); *C10M 2215/064* (2013.01); *C10M 2223/045* (2013.01); *C10N 2210/02* (2013.01); *C10N 2230/02* (2013.01); *C10N 2230/10* (2013.01); *C10N 2230/52* (2013.01); *C10N 2240/102* (2013.01)

(58) Field of Classification Search
CPC ............ C10M 141/06; C10M 159/22; C10M 2203/1025; C10M 2203/1045; C10M 2207/262; C10M 2215/064; C10M 2223/045; F02B 43/02; C10N 2210/02; C10N 2230/02; C10N 2230/10; C10N 2230/52; C10N 2240/102
See application file for complete search history.

(56) References Cited

U.S. PATENT DOCUMENTS

| | | |
|---|---|---|
| 3,036,003 A | 5/1962 | Verdol |
| 3,172,892 A | 3/1965 | Le Suer |
| 3,219,666 A | 11/1965 | Norman |
| 3,272,746 A | 9/1966 | Suer et al. |
| 3,275,554 A | 9/1966 | Wagenaar |
| 3,329,658 A | 7/1967 | Fields |
| 3,438,757 A | 4/1969 | Anderson et al. |
| 3,449,250 A | 6/1969 | Fields |
| 3,454,555 A | 7/1969 | Jong et al. |
| 3,565,804 A | 2/1971 | Anderson et al. |
| 3,586,629 A | 6/1971 | Frank et al. |
| 3,591,598 A | 7/1971 | Little et al. |
| 3,666,730 A | 5/1972 | Coleman |
| 3,980,569 A | 9/1976 | Pindar et al. |
| 4,234,435 A | 11/1980 | Meinhardt et al. |
| 5,716,912 A | 2/1998 | Harrison et al. |
| 6,165,235 A | 12/2000 | Kolp et al. |
| 6,372,696 B1 | 4/2002 | Tipton |
| 6,440,905 B1 | 8/2002 | Epps et al. |
| 2007/0027043 A1* | 2/2007 | Le Coent ............ C10M 159/22 508/460 |
| 2015/0087567 A1* | 3/2015 | Ushioda ............... C10M 163/00 508/198 |

FOREIGN PATENT DOCUMENTS

JP     2005263861    * 9/2005

OTHER PUBLICATIONS

Relationship between Chemical Structure and Effectiveness of some Metallic Dialkyl- and Diaryl-dithiophosphates in Different Lubricated Mechanisms, Jan. 1992, pp. 997-100.

* cited by examiner

*Primary Examiner* — Cephia D Toomer
(74) *Attorney, Agent, or Firm* — Thomas P. Weber

(57) ABSTRACT

This invention describes low sulfur marine distillate fuel trunk piston diesel engine lubricating oil compositions, as well as methods for operating trunk piston engines by fueling the engines with a low sulfur marine distillate fuel trunk piston diesel engine lubricating oil composition.

25 Claims, No Drawings

LOW SULFUR MARINE DISTILLATE FUEL TRUNK PISTON ENGINE OIL COMPOSITION

FIELD OF THE INVENTION

The present invention generally relates to a trunk piston engine oil composition designed for use with low sulfur distillate fuel where the lubricating oil has a low base number but is capable of providing oxidative stability, viscosity increase control, and improved detergency performance.

BACKGROUND OF THE INVENTION

Trunk piston engines are generally medium speed (300-1000 rpm), 4-stroke engines, in which a single lubricating oil is employed for lubrication of all areas of the engine, as opposed to the crosshead engines in which the crosshead allows for use of separate lubricants in the cylinder and in the crankcase. A trunk piston engine oil (TPEO) therefore has unique requirements for fuel compatibility, oxidative stability, viscosity increase control, and detergency.

Traditionally fuel oils used for the operation of trunk piston engines have ranged from heavy marine residual fuel to low sulfur distillate fuel. Recently, driven by health and environmental concerns, there has been increasing probability of future regulations mandating the use of low sulfur fuel for the operation of trunk piston engines. The use of low sulfur residual fuel requires that it is feasible for refineries to lower the sulfur level in residual fuel at a reasonable cost and effort. It is unknown whether there will be sufficient low-sulfur residual fuel oil available in the future, or whether low sulfur distillate fuel and gas oils will be used to a wider extent. It is therefore desirable to provide a trunk piston engine oil composition designed for use with low sulfur distillate fuel where the lubricating oil has a low base number but is capable of providing oxidative stability, viscosity increase control, and improved detergency performance.

Additives, especially metal-containing alkaline detergent additives, have been used for many years in TPEOs to neutralize acid combustion gases, maintain engine cleanliness, ensure compatibility of the lubricant with residual fuel oil, and control viscosity increase. However, it remains unclear if TPEOs formulated with additive technology developed for use with residual fuel oils will in fact be optimum for the low sulfur distillate marine fuels of the future due to differences in the characteristics of the fuels and differences in the environment of trunk piston engines due to the varying sources of fuels.

Key performance parameters for operating trunk piston engines with either heavy marine residual fuels or low sulfur distillate fuels include: deposit control of the piston cooling gallery (also known as the undercrown), deposit control of the piston ring pack (this includes the rings, lands and grooves), viscosity increase control, and sludge control. For marine residual fuels operation, these performance parameters are almost exclusively driven by asphaltenes contamination from the marine residual fuels.

For distillate fuel operation, however, where the fuel contains no significant asphaltenes these performance parameters are driven primarily by combustion by-products from the distillate fuel. Therefore, the requirements for engines operated using low sulfur distillate fuels versus marine residual fuels are very different. As a result, this does not allow for performance read-across of a formulation from distillate fuel operation to marine residual fuels operation or vice versa. A formulation that is specifically designed to offer optimum performance for marine residual fuels operation would not be expected to automatically provide acceptable performance for distillate fuel operation. For example, downtreating traditional 70 TBN Marine Cylinder Lubricant formulations optimized for high sulfur marine residual fuels operation to 40 TBN Marine Cylinder Lubricant formulation have been shown to have unacceptable performance for low sulfur Marine Cylinder Lubricant operation. Further, downtreating traditional 70 TBN Marine Cylinder Lubricant formulations optimized for high sulfur marine residual fuels operation to even lower TBN Marine Cylinder Lubricant formulations have also been found to have unacceptable performance for distillate fuel operation.

SUMMARY OF THE INVENTION

In accordance with one embodiment of the present invention, there is provided a low sulfur marine distillate fuel trunk piston diesel engine lubricating oil composition comprising:
(a) a major amount of a Group I base oil and/or a Group II base oil;
(b) a detergent composition comprising:
  (1) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent on an actives basis is from about 100 to 300 mg KOH/g; and
  (2) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent on an actives basis is greater than about 300 mg KOH/g;
wherein the ratio of weight % medium overbased detergent to weight % high overbased detergent is from about 0.1:1 to 10:1;
wherein the TBN of the composition is less than 30 mg KOH/g;
wherein the composition does not contain:
  (i) an overbased detergent comprising a salt of an alkyl-substituted hydroxybenzoic acid having at least 50 mole % of alkyl groups that are $C_{14}$-$C_{18}$; and
  (ii) a detergent comprising sulfurized metal alkyl phenate, and
further wherein the composition contains no detergent that does not contain a salt of an alkyl-substituted hydroxybenzoic acid.

In accordance with another embodiment of the present invention, there is provided a method for operating a trunk piston engine, the method comprising:
(a) fueling the engine with a low sulfur marine distillate fuel, and
(b) lubricating the engine with a lubricating oil composition comprising:
  (1) a major amount of a Group I base oil and/or a Group II base oil;
  (2) a detergent composition comprising:
    (i) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent on an actives basis is from about 100 to 300 mg KOH/g; and (ii) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent on an actives basis is greater than about 300 mg KOH/g;

wherein the ratio of weight % medium overbased detergent to weight % high overbased detergent is from about 0.1:1 to 10:1;

wherein the TBN of the composition is less than 30 mg KOH/g;

wherein the composition does not contain:
(i) an overbased detergent comprising a salt of an alkyl-substituted hydroxybenzoic acid having at least 50 mole % of alkyl groups that are $C_{14}$-$C_{18}$; and,
(ii) a detergent comprising sulfurized metal alkyl phenate, and further wherein the composition contains no detergent that does not contain a salt of an alkyl-substituted hydroxybenzoic acid.

It has now been surprisingly discovered that marine trunk piston engine lubricating oil compositions designed for the lubrication of trunk piston engines operating on low sulfur distillate fuel, comprising the above detergent composition leads to optimum performance in the areas of oxidative stability, viscosity increase control, and high temperature detergency. It has been further discovered that the addition of aminic anti-oxidant further improves performance in the areas of oxidative stability and viscosity increase control.

DEFINITIONS

The following terms will be used throughout the specification and will have the following meanings unless otherwise indicated. Any term, abbreviation or shorthand not defined is understood to have the ordinary meaning used by a skilled artisan contemporaneous with the submission of this application.

"A major amount" of an oil of lubricating viscosity refers to a concentration of the oil within the lubricating oil composition of at least about 40 wt. %. In some embodiments, "a major amount" of an oil of lubricating viscosity refers to a concentration of the oil within the lubricating oil composition of at least about 50 wt. %, at least about 60 wt. %, at least about 70 wt. %, at least about 80 wt. %, or at least about 90 wt. %.

A "residual fuel" refers to a material combustible in large marine engines which has a carbon residue, as defined in International Organization for Standardization (ISO) 10370 of at least 2.5 wt. % (e.g., at least 5 wt. %, or at least 8 wt. %) (relative to the total weight of the fuel), a viscosity at 50° C. of greater than 14.0 cSt, such as the marine residual fuels defined in the International Organization for Standardization specification ISO 8217:2005, "Petroleum products—Fuels (class F)—Specifications of marine fuels," the contents of which are incorporated herein in their entirety. Residual Fuel are primarily the non-boiling fractions of crude oil distillation. Depending on the pressures and temperatures in refinery distillation processes, and the types of crude oils, slightly more or less gas oil that could be boiled off is left in the non-boiling fraction, creating different grades of Residual Fuels.

A "marine residual fuel" refers to a fuel meeting the specification of a marine residual fuel as set forth in the ISO 8217:2010 international standard. A "low sulfur marine fuel" refers to a fuel meeting the specification of a marine residual fuel as set forth in the ISO 8217:2010 specification that, in addition, has about 1.5 wt. % or less, or even about 0.5% wt. % or less, of sulfur, relative to the total weight of the fuel, wherein the fuel is the residual product of a distillation process.

Distillate fuel is composed of petroleum fractions of crude oil that are separated in a refinery by a boiling or "distillation" process. A "marine distillate fuel" refers to a fuel meeting the specification of a marine distillate fuel as set forth in the ISO 8217:2010 international standard. A "low sulfur marine distillate fuel" refers to a fuel meeting the specification of a marine distillate fuel set forth in the ISO 8217:2010 international standard that, in addition, has about 0.1 wt. % or less, 0.05 wt. % or less, or even about 0.005 wt. % or less, of sulfur, relative to the total weight of the fuel, wherein the fuel is a distillation cut of a distillation process.

A "high sulfur fuel" refers to a fuel having greater than 1.5 wt. % of sulfur, relative to the total weight of the fuel.

A "conventional salicylate-based detergent" refers to an alkyl-substituted hydroxyaromatic detergent wherein at least 50% of the alkyl groups by volume are $C_{14}$-$C_{18}$ or less.

The term "bright stock", as used by persons skilled in the art, refers to base oils that are direct products of de-asphalted petroleum vacuum residuum or derived from de-asphalted petroleum vacuum residuum after further processing such as solvent extraction and/or dewaxing. For the purposes of this invention, it also refers to de-asphalted distillate cuts of a vacuum residuum process. Bright stocks generally have a kinematic viscosity at 100.degree. C. of from 28 to 36 mm.sup.2/s. One example of such a bright stock is ESSO™ Core 2500 Base Oil.

The term "Group II metal" or "alkaline earth metal" means calcium, barium, magnesium, and strontium.

The term "calcium base" refers to a calcium hydroxide, calcium oxide, calcium alkoxide and the like and mixtures thereof.

The term "lime" refers to calcium hydroxide also known as slaked lime or hydrated lime.

The term "alkylphenol" refers to a phenol group having one or more alkyl substituents at least one of which has a sufficient number of carbon atoms to impart oil solubility to the resulting phenate additive.

The term "Total Base Number" or "TBN" refers to the level of alkalinity in an oil sample, which indicates the ability of the composition to continue to neutralize corrosive acids, in accordance with ASTM Standard No. D2896 or equivalent procedure. The test measures the change in electrical conductivity, and the results are expressed as mgKOH/g (the equivalent number of milligrams of KOH needed to neutralize 1 gram of a product). Therefore, a high TBN reflects strongly overbased products and, as a result, a higher base reserve for neutralizing acids.

The term "base oil" as used herein shall be understood to mean a base stock or blend of base stocks which is a lubricant component that is produced by a single manufacturer to the same specifications (independent of feed source or manufacturer's location); that meets the same manufacturer's specification; and that is identified by a unique formula, product identification number, or both.

The term "on an actives basis" indicates that only the active component(s) of a particular additive are considered when determining the concentration or amount of that particular additive within the overall marine trunk piston engine lubricating oil composition. Diluent oil in the additive is excluded.

In the following description, all numbers disclosed herein are approximate values, regardless whether the word "about" or "approximate" is used in connection therewith. They may vary by 1 percent, 2 percent, 5 percent, or, sometimes, 10 to 20 percent.

The lubricating oil compositions, trunk piston engine lubricating oil compositions, and trunk piston engine oils (TPEO) described herein (collectively "lubricating oil compositions") can be used for lubricating any trunk piston engine, marine trunk piston engine, or compression-ignited (diesel) marine engine, such as a 4-stroke trunk piston engine or a 4-stroke diesel marine engine.

DETAILED DESCRIPTION OF THE INVENTION

In general, provided herein is a low sulfur marine distillate fuel trunk piston diesel engine lubricating oil composition comprising:
(a) a major amount of a Group I base oil and/or a Group II base oil;
(b) a detergent composition comprising:
  (1) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent is from about 100 to 300 mg KOH/g; and
  (2) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent is greater than about 300 mg KOH/g;
wherein the ratio of weight % medium overbased detergent to weight % high overbased detergent is from about 0.1:1 to 10:1;
wherein the TBN of the composition is less than 30 mg KOH/g;
wherein the composition does not contain:
  (i) an overbased detergent comprising a salt of an alkyl-substituted hydroxybenzoic acid having at least 50 mole % of alkyl groups that are $C_{14}$-$C_{18}$; and
  (ii) a detergent comprising sulfurized metal alkyl phenate, and
further wherein the composition contains no detergent that does not contain a salt of an alkyl-substituted hydroxybenzoic acid.

Also provided is a method for operating a trunk piston engine, the method comprising:
(a) fueling the engine with a low sulfur marine distillate fuel, and
(b) lubricating the engine with a lubricating oil composition comprising:
  (1) a major amount of a Group I base oil and/or a Group II base oil;
  (2) a detergent composition comprising:
    (i) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent is from about 100 to 300 mg KOH/g; and
    (ii) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent is greater than about 300 mg KOH/g;
wherein the ratio of weight % medium overbased detergent to weight % high overbased detergent is from about 0.1:1 to 10:1;
wherein the TBN of the composition is less than 30 mg KOH/g;
wherein the composition does not contain:
  (i) an overbased detergent comprising a salt of an alkyl-substituted hydroxybenzoic acid having at least 50 mole % of alkyl groups that are $C_{14}$-$C_{18}$; and,
  (ii) a detergent comprising a sulfurized metal alkyl phenate, and
further wherein the composition contains no detergent that does not contain a salt of an alkyl-substituted hydroxybenzoic acid.

The detergent composition employed in the present invention is a mixture of medium and high overbased alkali or alkaline earth metal salts of an alkyl-substituted hydroxybenzoic acid, wherein at least about 90 mole % of the alkyl groups are $C_{20}$ or greater.

In one embodiment, at least about 90 mole %, at least about 95 mole %, or at least about 99 mole % of the alkyl groups contained within the alkali or alkaline earth metal salt of an alkyl-substituted hydroxybenzoic acid detergent are a $C_{20}$ or higher (such as $C_{20}$ to $C_{40}$, $C_{20}$ to $C_{35}$, $C_{20}$ to $C_{30}$, $C_{20}$ to $C_{28}$, or $C_{20}$ to $C_{25}$). In another embodiment, the alkali or alkaline earth metal salt of an alkyl-substituted hydroxybenzoic acid is derived from an alkyl-substituted hydroxybenzoic acid in which the alkyl groups are the residue of straight chain normal alpha-olefins containing at least 90 mole % $C_{20}$ or higher straight chain normal alpha-olefins.

The resulting alkali or alkaline earth metal salt of an alkyl-substituted hydroxybenzoic acid will be a mixture of ortho and para isomers. In one embodiment, the product will contain about 1 to 99 wt. % ortho isomer and 99 to 1 wt. % para isomer. In another embodiment, the product will contain about 5 to 70 wt. % ortho and 95 to 30 wt. % para isomer.

The alkali or alkaline earth metal alkyl-substituted hydroxybenzoic acid detergent of the present invention, having a mixture of $C_{20}$ to $C_{28}$ alky groups, can be prepared from linear alpha olefin cuts, such as those marketed by Chevron Philips Chemical Company under the names Normal Alpha Olefin $C_{26}$ to $C_{28}$ or Normal Alpha Olefin $C_{20}$ to $C_{24}$ having from about 20 to 28 carbon atoms.

As noted above, the alkali or alkaline earth metal salts of an alkyl-substituted hydroxybenzoic acid detergent composition is a mixture of medium and high overbased detergents. Generally, an overbased alkali or alkaline earth metal salt of an alkyl-substituted hydroxybenzoic acid is one in which the TBN of the alkali or alkaline earth metal salts of an alkyl-substituted hydroxybenzoic acid has been increased by a process such as the addition of a base source (e.g., lime) and an acidic overbasing compound (e.g., carbon dioxide).

In one embodiment, the medium overbased detergentis an overbased salt having a TBN from about 100 to about 300 mg KOH/g on an actives basis. In one embodiment, the TBN of the medium overbased detergent is from 150 to 300-mg KOH/g. In another embodiment, the TBN of a medium overbased detergent is from 100 to 260 mg KOH/g. In another embodiment, the TBN of a medium overbased detergent is from 150 to 260 mg KOH/g In one embodiment, the high overbased detergent is an overbased salt having a TBN greater than 300 mg KOH/g on an actives basis. In one embodiment, the TBN of the high overbased detergent is from 325 to 700 mg KOH/g. In another embodiment, the TBN of the high overbased detergent is from 350 to 650 mg KOH/g. In another embodiment, the TBN of the high overbased detergent is from 350 to 600 mg KOH/g. In another embodiment, the TBN of a high overbased detergent is from 400 to 600 mg KOH/g.

Generally, the medium and high overbased detergents are each present in the lubricating oil composition in an amount ranging from about 0.01 wt. % to about 10 wt. %, based on the total weight of the lubricating oil composition. In one embodiment, the medium overbased detergent is present at from 1 to 8 wt %. In one embodiment, the medium overbased detergent is present at from 1 to 6 wt %. In one embodiment, the medium overbased detergent is present at from 1 to 5 wt %. In one embodiment, the medium overbased detergent is present at from 2 to 5 wt %.

In one embodiment, the high overbased detergent is present at from 1 to 8 wt %. In one embodiment, the high overbased detergent is present at from 1 to 6 wt %. In one embodiment, the high overbased detergent is present at from 1 to 5 wt %. In one embodiment, the high overbased detergent is present at from 1 to 4 wt %.

In one embodiment, the ratio of the medium overbased detergent to the high overbased detergent is 0.1:1 to 10.1 based on the weight % of the medium overbased detergent to the weight % of the high overbased detergent in the lubricating oil composition. In other embodiments the ratio is 1.0:1 to 3.0:1, 0.5:1 to 5:1, 1.15:1 to 2.0:1 and 0.1:1 to 5:1.

In one embodiment, the medium overbased detergent can be prepared from alkylphenols, for example, according to the method described in Example 3 of U.S. Patent Application Publication No. 2007/0027043, the contents of which are incorporated herein by reference in their entirety.

In one embodiment, the high overbased detergent can be prepared from alkylphenols, for example, according to the method described in Example 1 of U.S. Patent Application Publication No. 2007/0027043, the contents of which are incorporated herein by reference in their entirety.

When an alkali metal is employed, the alkali metal is lithium, sodium or potassium.

When an alkaline earth metal is employed, the alkaline earth metal can be selected from the group consisting of calcium, barium, magnesium and strontium. Calcium and magnesium are preferred. More preferred is calcium.

In one embodiment, the TBN of the lubricating oil composition is less than 30 mg KOH/g. In other embodiments, the TBN of the lubricating oil composition is from 5 to 25, from 6 to 20, from 8 to 18, 10 to 16, and 16 mg KOH/g.

In one embodiment, the lubricating oil composition contains no detergent that does not contain a salt of an alkyl-substituted hydroxybenzoic acid.

In one embodiment the lubricating oil composition does not contain an overbased detergent comprising a salt of an alkyl-substituted hydroxybenzoic acid having at least 50 volume % of alkyl groups that are $C_{14}$ to $C_{18}$.

In the present invention, the lubricating oil composition does not contain a salt of a sulfonic acid.

In the present invention, the lubricating oil composition does not contain a conventional salicylate-based detergent.

In the present invention, the detergent of the lubricating oil composition does not contain a sulfurized metal alkyl phenate.

In one embodiment, the lubricating oil composition contains an antioxidant. Examples of antioxidants include, but are not limited to, aminic types, such as diphenylamine, phenyl-alpha-napthyl-amine, N,N-di(alkylphenyl)amines, alkylated phenylene-diamines, alkylated diphenylamines, and mixtures thereof. In one embodiment, the aminic antioxidant is alkylated diphenylamine. Examples of phenolic type antioxidants include, BHT, sterically hindered alkyl phenols such as 2,6-di-tert-butylphenol, 2,6-di-tert-butyl-p-cresol and 2,6-di-tert-butyl-4-(2-octyl-3-propanoic) phenol; and mixtures thereof. The amount of the antioxidant may vary from about 0.01 wt. % to about 10 wt. %, from about 0.05 wt. % to about 5 wt. %, or from about 0.1 wt. % to about 3 wt. %, based on the total weight of the lubricating oil composition. Some suitable antioxidants have been described in Leslie R. Rudnick, "Lubricant Additives: Chemistry and Applications," New York, Marcel Dekker, Chapter 1, pages 1-28 (2003), which is incorporated herein by reference.

The Oil of Lubricating Viscosity

The base oil of lubricating viscosity for use in the lubricating oil compositions of this invention is typically present in a major amount, e.g., an amount of greater than 50 wt. %, preferably greater than about 70 wt. %, more preferably from about 80 to about 99.5 wt. % and most preferably from about 85 to about 98 wt. %, based on the total weight of the composition. The expression "base oil" as used herein shall be understood to mean a base stock or blend of base stocks which is a lubricant component that is produced by a single manufacturer to the same specifications (independent of feed source or manufacturer's location); that meets the same manufacturer's specification; and that is identified by a unique formula, product identification number, or both. The base oil for use herein can be any presently known or later-discovered base oil of lubricating viscosity used in formulating lubricating oil compositions for any and all such applications, e.g., engine oils, marine cylinder oils, functional fluids such as hydraulic oils, gear oils, transmission fluids, etc. Additionally, the base oils for use herein can optionally contain viscosity index improvers, e.g., polymeric alkylmethacrylates; olefinic copolymers, e.g., an ethylene-propylene copolymer or a styrene-butadiene copolymer; and the like and mixtures thereof.

As one skilled in the art would readily appreciate, the viscosity of the base oil is dependent upon the application. Accordingly, the viscosity of a baseoil for use herein will ordinarily range from about 2 to about 2000 centistokes (cSt) at 100° Centigrade (C). Generally, individually the base oils used as engine oils will have a kinematic viscosity range at 100° C. of about 2 cSt to about 30 cSt, preferably about 3 cSt to about 16 cSt, and most preferably about 4 cSt to about 12 cSt and will be selected or blended depending on the desired end use and the additives in the finished oil to give the desired grade of engine oil, e.g., a lubricating oil composition having an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40, 10W-50, 15W, 15W-20, 15W-30 or 15W-40. Oils used as gear oils can have viscosities ranging from about 2 cSt to about 2000 cSt at 100° C.

Base stocks may be manufactured using a variety of different processes including, but not limited to, distillation, solvent refining, hydrogen processing, oligomerization, esterification, and rerefining. Rerefined stock shall be substantially free from materials introduced through manufacturing, contamination, or previous use. The base oil of the lubricating oil compositions of this invention may be any Group I and/or Group II lubricating base oil.

The base oil may be derived from natural lubricating oils, synthetic lubricating oils or mixtures thereof. Suitable base oil includes base stocks obtained by isomerization of synthetic wax and slack wax, as well as hydrocracked base stocks produced by hydrocracking (rather than solvent extracting) the aromatic and polar components of the crude. Suitable base oils include those in API categories I and II, as defined in API Publication 1509, 14th Edition, Addendum I, December 1998 Group I and II base oils are preferred for use in this invention.

The saturates levels, sulfur levels and viscosity indices for Group I and II base oils are listed in Table 1 below.

TABLE 1

| Group | Saturates (As determined by ASTM D 2007) | Sulfur (As determined by ASTM D 2270) | Viscosity Index (As determined by ASTM D 4294, ASTM D 4297 or ASTM D 3120) |
|---|---|---|---|
| I | Less than 90% saturates. | Greater than or equal to 0.03% sulfur. | Greater than or equal to 80 and less than 120. |
| II | Greater than or equal to 90% saturates. | Less than or equal to 0.03% sulfur. | Greater than or equal to 80 and less than 120. |

In one embodiment, the base oil is a Group II base oil, or a blend of two or more different Group II base oils. In another embodiment, the base oil is a Group I base oil, or a blend of two or more different Group I base oils. In another embodiment, the base oil is a mixture of Group I and Group II base oils. Suitable Group I base oils include, for example, any light overhead cuts and heavier side cuts from a vacuum distillation column, such as, for example, any Light Neutral, Medium Neutral, and Heavy Neutral base stocks. The petroleum derived base oil also may include residual stocks or bottoms fractions, such as, for example, bright stock. Bright stock is a high viscosity base oil which has been conventionally produced from residual stocks or bottoms and has been highly refined and dewaxed. Bright stock can have a kinematic viscosity greater than about 180 cSt at 40° C., or even greater than about 250 cSt at 40° C., or even ranging from about 500 to about 1100 cSt at 40° C.

Useful natural oils include mineral lubricating oils such as, for example, liquid petroleum oils, solvent-treated or acid-treated mineral lubricating oils of the paraffinic, naphthenic or mixed paraffinic-naphthenic types, oils derived from coal or shale, animal oils, vegetable oils (e.g., rapeseed oils, castor oils and lard oil), and the like.

The lubricating oil may be derived from unrefined, refined and rerefined oils, either natural, synthetic or mixtures of two or more of any of these of the type disclosed hereinabove. Unrefined oils are those obtained directly from a natural or synthetic source (e.g., coal, shale, or tar sands bitumen) without further purification or treatment. Examples of unrefined oils include, but are not limited to, a shale oil obtained directly from retorting operations, a petroleum oil obtained directly from distillation or an ester oil obtained directly from an esterification process, each of which is then used without further treatment. Refined oils are similar to the unrefined oils except they have been further treated in one or more purification steps to improve one or more properties. These purification techniques are known to those of skill in the art and include, for example, solvent extractions, secondary distillation, acid or base extraction, filtration, percolation, hydrotreating, dewaxing, etc. Rerefined oils are obtained by treating used oils in processes similar to those used to obtain refined oils. Such rerefined oils are also known as reclaimed or reprocessed oils and often are additionally processed by techniques directed to removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over a hydroisomerization catalyst.

Natural waxes are typically the slack waxes recovered by the solvent dewaxing of mineral oils; synthetic waxes are typically the wax produced by the Fischer-Tropsch process.

Additional Lubricating Oil Additives

The lubricating oil compositions prepared by the process of the present invention may also contain other conventional additives for imparting auxiliary functions to give a finished lubricating oil composition in which these additives are dispersed or dissolved. For example, the lubricating oil compositions can be blended with antioxidants, anti-wear agents, ashless dispersants, detergents, rust inhibitors, dehazing agents, demulsifying agents, metal deactivating agents, friction modifiers, antifoaming agents, pour point depressants, co-solvents, package compatibilisers, corrosion-inhibitors, dyes, extreme pressure agents and the like and mixtures thereof. A variety of the additives are known and commercially available. These additives, or their analogous compounds, may be employed for the preparation of the lubricating oil compositions of the invention by the usual blending procedures.

Examples of antiwear agents include, but are not limited to, zinc dialkyldithiophosphates and zinc diaryldithiophosphates, e.g., those described in an article by Born et al. entitled "Relationship between Chemical Structure and Effectiveness of some Metallic Dialkyl- and Diaryldithiophosphates in Different Lubricated Mechanisms", appearing in Lubrication Science 4-2 Jan. 1992, see for example pages 97-100; aryl phosphates and phosphites, sulfur-containing esters, phosphosulfur compounds, metal or ash-free dithiocarbamates, xanthates, alkyl sulfides and the like and mixtures thereof.

Representative examples of ashless dispersants include, but are not limited to, amines, alcohols, amides, or ester polar moieties attached to a polymer backbone via bridging groups. An ashless dispersant of the present invention may be, for example, selected from oil soluble salts, esters, amino-esters, amides, imides, and oxazolines of long chain hydrocarbon substituted mono and dicarboxylic acids or their anhydrides; thiocarboxylate derivatives of long chain hydrocarbons, long chain aliphatic hydrocarbons having a polyamine attached directly thereto; and Mannich condensation products formed by condensing a long chain substituted phenol with formaldehyde and polyalkylene polyamine.

Carboxylic dispersants are reaction products of carboxylic acylating agents (acids, anhydrides, esters, etc.) comprising at least about 34 and preferably at least about 54 carbon atoms with nitrogen containing compounds (such as amines), organic hydroxy compounds (such as aliphatic compounds including monohydric and polyhydric alcohols, or aromatic compounds including phenols and naphthols), and/or basic inorganic materials. These reaction products include imides, amides, esters, and salts.

Succinimide dispersants are a type of carboxylic dispersant. They are produced by reacting hydrocarbyl-substituted succinic acylating agent with organic hydroxy compounds, or with amines comprising at least one hydrogen atom attached to a nitrogen atom, or with a mixture of the hydroxy compounds and amines. The term "succinic acylating agent" refers to a hydrocarbon-substituted succinic acid or a succinic acid-producing compound, the latter encompasses the acid itself. Such materials typically include hydrocarbyl-substituted succinic acids, anhydrides, esters (including half esters) and halides.

Succinic-based dispersants have a wide variety of chemical structures. One class of succinic-based dispersants may be represented by formula I:

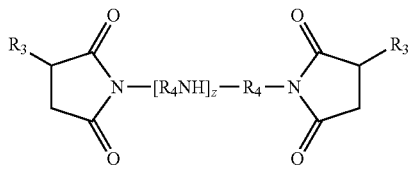

Formula I wherein each $R_3$ is independently a hydrocarbyl group, such as a polyolefin-derived group. Typically the hydrocarbyl group is an alkenyl group, such as a polyisobutenyl group. Alternatively expressed, the $R_3$ groups can contain about 40 to about 500 carbon atoms, and these atoms may be present in aliphatic forms. $R_4$ is an alkylene group, commonly an ethylene ($C_2H_4$) group; and z is 1 to 11. Examples of succinimide dispersants include those described in, for example, U.S. Pat. Nos. 3,172,892, 4,234,435 and 6,165,235.

The polyalkenes from which the substituent groups are derived are typically homopolymers and interpolymers of polymerizable olefin monomers of 2 to about 16 carbon atoms, and usually 2 to 6 carbon atoms. The amines which are reacted with the succinic acylating agents to form the carboxylic dispersant composition can be monoamines or polyamines.

Succinimide dispersants are referred to as such since they normally contain nitrogen largely in the form of imide functionality, although the nitrogen functionality may be in the form of amines, amine salts, amides, imidazolines as well as mixtures thereof. To prepare a succinimide dispersant, one or more succinic acid-producing compounds and one or more amines are heated and typically water is removed, optionally in the presence of a substantially inert organic liquid solvent/diluent. The reaction temperature can range from about 80° C. up to the decomposition temperature of the mixture or the product, which typically falls between about 100° C. to about 300° C. Additional details and examples of procedures for preparing the succinimide dispersants of the present invention include those described in, for example, U.S. Pat. Nos. 3,172,892, 3,219,666, 3,272,746, 4,234,435, 6,165,235 and 6,440,905.

Suitable ashless dispersants may also include amine dispersants, which are reaction products of relatively high molecular weight aliphatic halides and amines, preferably polyalkylene polyamines. Examples of such amine dispersants include those described in, for example, U.S. Pat. Nos. 3,275,554, 3,438,757, 3,454,555 and 3,565,804.

Suitable ashless dispersants may further include "Mannich dispersants," which are reaction products of alkyl phenols in which the alkyl group contains at least about 30 carbon atoms with aldehydes (especially formaldehyde) and amines (especially polyalkylene polyamines). Examples of such dispersants include those described in, for example, U.S. Pat. Nos. 3,036,003, 3,586,629, 3,591,598 and 3,980,569.

In one embodiment, the ashless dispersant is prepared by reacting, under reactive conditions, a mixture of a polybutene succinic acid derivative, an unsaturated acidic reagent copolymer of an unsaturated acidic reagent and an olefin, and a polyamine, such as disclosed in U.S. Pat. No. 5,716,912, the contents of which are incorporated herein by reference.

Suitable ashless dispersants may also be polymeric, which are interpolymers of oil-solubilizing monomers such as decyl methacrylate, vinyl decyl ether and high molecular weight olefins with monomers containing polar substitutes. Examples of polymeric dispersants include those described in, for example, U.S. Pat. Nos. 3,329,658; 3,449,250 and 3,666,730.

Generally, the one or more ashless dispersants are present in the lubricating oil composition in an amount ranging from about 0.01 wt. % to about 10 wt. %, based on the total weight of the lubricating oil composition.

Examples of rust inhibitors include, but are not limited to, nonionic polyoxyalkylene agents, e.g., polyoxyethylene lauryl ether, polyoxyethylene higher alcohol ether, polyoxyethylene nonylphenyl ether, polyoxyethylene octylphenyl ether, polyoxyethylene octyl stearyl ether, polyoxyethylene oleyl ether, polyoxyethylene sorbitol monostearate, polyoxyethylene sorbitol monooleate, and polyethylene glycol monooleate; stearic acid and other fatty acids; dicarboxylic acids; metal soaps; fatty acid amine salts; metal salts of heavy sulfonic acid; partial carboxylic acid ester of polyhydric alcohol; phosphoric esters; (short-chain) alkenyl succinic acids; partial esters thereof and nitrogen-containing derivatives thereof; synthetic alkarylsulfonates, e.g., metal dinonylnaphthalene sulfonates; and the like and mixtures thereof.

Examples of friction modifiers include, but are not limited to, alkoxylated fatty amines; borated fatty epoxides; fatty phosphites, fatty epoxides, fatty amines, borated alkoxylated fatty amines, metal salts of fatty acids, fatty acid amides, glycerol esters, borated glycerol esters; and fatty imidazolines as disclosed in U.S. Pat. No. 6,372,696, the contents of which are herein incorporated by reference; friction modifiers obtained from a reaction product of a $C_4$ to $C_{75}$, preferably a $C_6$ to $C_{24}$, and most preferably a $C_6$ to $C_{20}$, fatty acid ester and a nitrogen-containing compound selected from the group consisting of ammonia, and an alkanolamine and the like and mixtures thereof.

Examples of antifoaming agents include, but are not limited to, polymers of alkyl methacrylate; polymers of dimethylsilicone and the like and mixtures thereof.

Examples of a pour point depressant include, but are not limited to, polymethacrylates, alkyl acrylate polymers, alkyl methacrylate polymers, di(tetra-paraffin phenol)phthalate, condensates of tetra-paraffin phenol, condensates of a chlorinated paraffin with naphthalene and combinations thereof. In one embodiment, a pour point depressant comprises an ethylene-vinyl acetate copolymer, a condensate of chlorinated paraffin and phenol, polyalkyl styrene and the like and combinations thereof. The amount of the pour point depressant may vary from about 0.01 wt. % to about 10 wt. %.

Examples of a demulsifier include, but are not limited to, anionic surfactants (e.g., alkyl-naphthalene sulfonates, alkyl benzene sulfonates and the like), nonionic alkoxylated alkylphenol resins, polymers of alkylene oxides (e.g., polyethylene oxide, polypropylene oxide, block copolymers of ethylene oxide, propylene oxide and the like), esters of oil soluble acids, polyoxyethylene sorbitan ester and the like and combinations thereof. The amount of the demulsifier may vary from about 0.01 wt. % to about 10 wt. %.

Examples of a corrosion inhibitor include, but are not limited to, half esters or amides of dodecylsuccinic acid, phosphate esters, thiophosphates, alkyl imidazolines, sarcosines and the like and combinations thereof. The amount of the corrosion inhibitor may vary from about 0.01 wt. % to about 5 wt. %.

Examples of an extreme pressure agent include, but are not limited to, sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, amine salts of phosphoric acid esters or thiophosphoric acid esters and the like and combinations thereof. The amount of the extreme pressure agent may vary from about 0.01 wt. % to about 5 wt. %.

Each of the foregoing additives, when used, is used at a functionally effective amount to impart the desired properties to the lubricant. Thus, for example, if an additive is a friction modifier, a functionally effective amount of this friction modifier would be an amount sufficient to impart the desired friction modifying characteristics to the lubricant. Generally, the concentration of each of these additives, when used, may range, unless otherwise specified, from about 0.001% to about 20% by weight, and in one embodiment about 0.01% to about 10% by weight based on the total weight of the lubricating oil composition.

The final application of the lubricating oil compositions containing the molybdated succinimide complexes prepared by the process of this invention may be, for example, in marine cylinder lubricants in crosshead diesel engines, crankcase lubricants in automobiles and railroads and the like, lubricants for heavy machinery such as steel mills and the like, or as greases for bearings and the like. Whether the lubricating oil composition is fluid or solid will ordinarily depend on whether a thickening agent is present. Typical thickening agents include polyurea acetates, lithium stearate and the like.

In another embodiment of the invention, the composition prepared by the process of the present invention may be provided as an additive package or concentrate in which the additive is incorporated into a substantially inert, normally liquid organic diluent such as, for example, mineral oil, naphtha, benzene, toluene or xylene to form an additive concentrate. These concentrates usually contain from about 20% to about 80% by weight of such diluent. Typically, a neutral oil having a viscosity of about 4 to about 8.5 cSt at 100° C. and preferably about 4 to about 6 cSt at 100° C. will be used as the diluent, though synthetic oils, as well as other organic liquids which are compatible with the additives and finished lubricating oil can also be used. The additive package will also typically contain one or more of the various other additives, referred to above, in the desired amounts and ratios to facilitate direct combination with the requisite amount of base oil.

EXAMPLES

The following non-limiting examples are illustrative of the present invention.

Examples 1 and 2, and Comparative Examples 1, 2, 5, and 6

Table 2 below lists Examples 1 and 2, and Comparative Examples 1, 2, 5, and 6. The finished trunk piston engine lubricating oil compositions were prepared by mixing together the appropriate Group I or Group II basestock, the appropriate detergent composition, 0.67 wt-% of a secondary zinc dialkyldithiophosphate, 0.68 wt-% as active content of a non-post treated bis-succinimide dispersant, and a foam inhibitor. Each example had a TBN of about 15 mgKOH/g and were formulated to SAE 40 viscosity grade.

TABLE 2

SAE 40, 15 BN Trunk Piston Engine Lubricating Oil Compositions (Without Antioxidant)

|  | Ex. 1 | Comp. 1 | Ex. 2 | Comp. 2 | Comp 5 | Comp 6 |
|---|---|---|---|---|---|---|
| Detergent A (150 BN carboxylate), wt. % | 3.33 | — | 3.33 | — | | |
| Detergent B (350 BN carboxylate), wt. % | 2.86 | — | 2.86 | — | | |
| Detergent C (170 BN salicylate), wt. % | — | 2.94 | — | 2.94 | | |
| Detergent D (280 BN salicylate), wt. % | — | 2.86 | — | 2.86 | | |
| Detergent E (425 BN sulfonate), wt. % | | | | | 2.35 | 2.35 |
| Detergent F (260 BN phenate), wt. % | | | | | 1.90 | 1.90 |
| XOM Core 600N (Grp I), wt. % | 80.28 | 77.20 | — | — | 81.76 | — |
| XOM Core 2500BS (Grp I), wt. % | 11.82 | 15.29 | 11.82 | 15.29 | 12.28 | 12.28 |
| Chevron RLOP 600R (Grp II), wt. % | — | — | 80.28 | 77.20 | — | 82.35 |
| Viscosity (100° C.), mm$^2$/s | 14.78 | 14.96 | 14.34 | 14.53 | 14.56 | 14.07 |

Detergent A: This is an oil concentrate of an overbased calcium alkylhydroxybenzoate additive, wherein at least 90 mole % of the alkyl groups are derived from $C_{20}$ to $C_{28}$ linear olefins, prepared according to the method described in Example 1 of US Patent Application 2007/0027043. This additive contained 5.35 wt. % Ca, and about 35.0 wt. % diluent oil, and had a TBN of 150. On an actives basis, the TBN of this additive is about 230.
Detergent B: This is an oil concentrate of an overbased calcium alkylhydroxybenzoate additive, having an alkyl substituent derived from $C_{20}$ to $C_{28}$ linear olefins, prepared according to the method described in Example 1 of US Patent Application 2007/0027043. This additive contained 12.5 wt. % Ca, and about 33.0 wt. % diluent oil, and had a TBN of 350. On an actives basis, the TBN of this additive is about 520.
Detergent C (MOB salicylate): This is a commercially available oil concentrate of a medium overbased Ca salicylate detergent additive; $CO_2$-overbased Ca primarily mono-alkylated hydroxybenzoate detergent with a nominal TBN of 170. The alkyl group is nearly quantitatively $C_{14}$-$C_{18}$. This additive contained 6.0 wt. % Ca.
Detergent D (HOB salicylate): This is a commercially available concentrate of a high overbased Ca salicylate detergent additive; CO2-overbased Ca primarily mono-alkylated hydroxybenzoate detergent with a nominal TBN of 280. The alkyl group is nearly quantitatively $C_{14}$-$C_{18}$. This additive contained 10 wt. % Ca.
Detergent E: This additive is an oil concentrate of a 425 TBN high overbased alkaryl calcium sulfonate detergent.
Detergent F: This additive is an oil concentrate of a 260 TBN overbased sulfurized calcium alkylphenate detergent derived from phenol alkylated with propylene tetramer.
Aminic Antioxidant: This additive is alkylated diphenylamine derived from diphenylamine and nonene.

The Group I basestocks used were ExxonMobil CORE® 600 Group I base stock and/or ExxonMobil CORE® 2500BS Group I bright stock. The Group II basestock was Chevron 600R Group II base stock, available from Chevron Products Co. (San Ramon, Calif.).

Examples 3 and 4, and Comparative Examples 3, 4, 7, and 8

Table 3 below lists Examples 3 and 4, and Comparative Examples 3, 4, 7, and 8. The finished trunk piston engine lubricating oil compositions of Table 2 were prepared by mixing together the appropriate Group I or Group II basestock, the appropriate detergent composition, 0.67 wt. % of a secondary zinc dialkyldithiophosphate, 0.68 wt. % as active content of a bis-succinimide dispersant, and foam inhibitor. In addition, each composition further contained 0.50 wt. % of a dinonyl diphenylamine anti-oxidant. Each example had a TBN of about 15 mgKOH/g and was formulated to SAE 40 viscosity grade.

TABLE 3

SAE 40, 15 BN Trunk Piston Engine Lubricating Oil Compositions (With Antioxidant)

|  | Ex. 3 | Comp. 3 | Ex. 4 | Comp. 4 | Comp. 7 | Comp. 8 |
|---|---|---|---|---|---|---|
| Detergent A (150 BN carboxylate), wt. % | 3.33 | — | 3.33 | — | | |
| Detergent B (350 BN carboxylate), wt. % | 2.66 | — | 2.66 | — | | |
| Detergent C (170 BN salicylate), wt. % | — | 2.94 | — | 2.94 | | |
| Detergent D (280 BN salicylate), wt. % | — | 2.66 | — | 2.66 | | |
| Detergent E (425 BN sulfonate), wt. % | | | | | 2.19 | 2.19 |
| Detergent F (260 BN phenate), wt. % | | | | | 1.90 | 1.90 |
| Aminic Anti-oxidant, wt. % | 0.50 | 0.50 | 0.50 | 0.50 | 0.50 | 0.50 |
| XOM Core 600N (Grp I), wt. % | 80.61 | 77.57 | — | — | 81.70 | |
| XOM Core 2500BS (Grp I), wt. % | 11.19 | 14.62 | 11.19 | 14.62 | 12.00 | 12.00 |
| Chevron RLOP 600R (Grp II), wt. % | — | — | 80.61 | 77.57 | | 81.70 |
| Viscosity (100° C.), mm$^2$/s | 14.66 | 14.8 | 14.22 | 14.42 | 14.49 | 14.03 |

Each example in Tables 2 and 3 were evaluated using the following tests:

1. The Komatsu Hot Tube (KHT) test, which is a measure of high temperature detergency;
2. The Modified Institute of Petroleum 48 ("MIP-48") test, which is a measure of the degree of stability against oxidation-based viscosity increase of the lubricant, and
3. The Differential Scanning calorimeter (DSC) Test which is used to evaluate thin film oxidation stability of test oils.

Modified Institute of Petroleum 48 Test

The MIP-48 Test measures the degree of stability against oxidation-based viscosity increase of the lubricant. The test consists of a thermal and an oxidative part. During both parts of the test the test samples are heated for a period of time. In the thermal part of the test, nitrogen is passed through a heated oil sample for 24 hours and in parallel during the oxidative part of the test, air is passed through a heated oil sample for 24 hours. The samples were cooled and the viscosities of both samples were determined. The BN depletion and viscosity increase of the test oil caused by oxidation are determined and corrected for the thermal effect. The oxidation-based viscosity increase for each marine trunk piston engine oil composition was calculated by subtracting the kinematic viscosity at 200° C. for the nitrogen-blown sample from the kinematic viscosity at 200° C. for the air-blown sample, and dividing the subtraction product by the kinematic viscosity at 200° C. for the nitrogen blown sample.

The results MIP-48 Test are set forth in Table 4 below.

TABLE 4

|  | Detergent | Base Oil | BN depletion (%) | viscosity increase (%) |
|---|---|---|---|---|
| Ex. 1 | Carboxylate | Group I | 40.1 | 23.0 |
| Comp. 1 | Salicylate | Group I | 42.3 | 38.6 |
| Ex. 2 | Carboxylate | Group II | 24.2 | 12.9 |
| Comp. 2 | Salicylate | Group II | 24.8 | 25.4 |
| Comp. 5 | Sulfonate/Phenate | Group I | 47.6 | 62.4 |
| Comp. 6 | Sulfonate/Phenate | Group II | 32.0 | 73.4 |

TABLE 4-continued

|  | Detergent | Base Oil | BN depletion (%) | viscosity increase (%) |
|---|---|---|---|---|
| Ex. 3 | Carboxylate | Group I | 38.8 | 16.1 |
| Comp. 3 | Salicylate | Group I | 41.5 | 26.2 |
| Ex. 4 | Carboxylate | Group II | 19.0 | 0.1 |
| Comp. 4 | Salicylate | Group II | 19.6 | 1.0 |
| Comp. 7 | Sulfonate/Phenate | Group I | 45.7 | 33.1 |
| Comp. 8 | Sulfonate/Phenate | Group II | 32.9 | 8.3 |

As is evident from the results in Table 4, the trunk piston engine lubricating oil compositions containing a carboxylate-containing detergent (examples 1 to 4) exhibited surprisingly better stability against oxidation-based viscosity increase and lower percentages of BN depletion than did the corresponding lubricating oil composition that contained conventional salicylate-containing detergents or a combination of conventional sulfonate and phenate detergents. As is further evident from the results, the addition of aminic anti-oxidant to the examples of the invention further improves MIP-48 performance.

Komatsu Hot Tube (KHT) Test

The Komatsu Hot Tube test is a lubrication industry bench test that measures the degree of high temperature detergency and thermal and oxidative stability of a lubricating oil. During the test, a specified amount of test oil is pumped upwards through a glass tube that is placed inside an oven set at a certain temperature. Air is introduced in the oil stream before the oil enters the glass tube, and flows upward with the oil. Evaluations of the marine trunk piston engine lubricating oils were conducted at temperatures between 300-320° C. After cooling and washing, the test result is determined by comparing the amount of lacquer deposited on the glass test tube to a rating scale ranging from 1.0 (very black) to 10.0 (perfectly clean). The result is reported in multiples of 0.5.

The results of the KHT Test are set forth in Table 5 below.

TABLE 5

KHT Results for TPEO Compositions of Tables 1 and 2

| | Detergent | Base Oil | @ 300° C., rating | @ 310° C., rating | @ 320° C., rating |
|---|---|---|---|---|---|
| Ex. 1 | Carboxylate | Group I | 8.5 | 8.5 | 5.0 |
| Comp. 1 | Salicylate | Group I | 8.5 | 8.0 | 2.0 |
| Ex. 2 | Carboxylate | Group II | 8.5 | 6.5 | 3.0 |
| Comp. 2 | Salicylate | Group II | 8.5 | 7.5 | 2.0 |
| Comp. 5 | Sulfonate/Phenate | Group I | 8.0 | 5.0 | 3.0 |
| Comp. 6 | Sulfonate/Phenate | Group II | 8.0 | 6.0 | 2.5 |
| Ex. 3 | Carboxylate | Group I | 8.5 | 8.0 | 4.0 |
| Comp. 3 | Salicylate | Group I | 9.0 | 6.5 | 2.5 |
| Ex. 4 | Carboxylate | Group II | 8.5 | 7.0 | 2.5 |
| Comp. 4 | Salicylate | Group II | 8.0 | 6.0 | 2.0 |
| Comp. 7 | Sulfonate/Phenate | Group I | 8.0 | 5.0 | 2.5 |
| Comp. 8 | Sulfonate/Phenate | Group II | 8.0 | 5.0 | 1.0 |

As is evident from the results illustrated in Table 5, the trunk piston engine lubricating oil compositions containing a carboxylate-containing detergent exhibited surprisingly better detergency and oxidative stability properties at elevated temperatures, as is evident by their overall higher ratings, than did the lubricating oil compositions that contained a conventional salicylate-containing detergent, or a combination of conventional sulfonate and phenate detergents, particularly at the higher temperature of 320° C.

Differential Scanning Calorimeter (DSC) Test

The DSC test is used to evaluate thin film oxidation stability of test oils, in accordance with ASTM D-6186. Heat flow to and from test oil in a sample cup is compared to a reference cup during the test. The Oxidation Onset Temperature is the temperature at which the oxidation of the test oil starts. The Oxidation Induction Time is the time at which the oxidation of the test oil starts. (Higher Oxidation Induction Time means better performance). The oxidation reaction results in an exothermic reaction which is clearly shown by the heat flow. The Oxidation Induction Time is calculated to evaluate the thin film oxidation stability of the test oil.

The results of the DSC Test are set forth in Table 6 below.

TABLE 6

DSC Oxidation Test Results for TPEO Compositions of Tables 2 and 3

| | Detergent | Base Oil | Oxidation Induction Time (min.) |
|---|---|---|---|
| Ex. 1 | Carboxylate | Group I | 23.54 |
| Comp. 1 | Salicylate | Group I | 22.24 |
| Ex. 2 | Carboxylate | Group II | 25.76 |
| Comp. 2 | Salicylate | Group II | 22.98 |
| Comp. 5 | Sulfonate/Phenate | Group I | 13.26 |
| Comp. 6 | Sulfonate/Phenate | Group II | 17.22 |
| Ex. 3 | Carboxylate | Group I | 30.14 |
| Comp. 3 | Salicylate | Group I | 27.35 |
| Ex. 4 | Carboxylate | Group II | 30.40 |
| Comp. 4 | Salicylate | Group II | 29.91 |
| Comp. 7 | Sulfonate/Phenate | Group I | 23.62 |
| Comp. 8 | Sulfonate/Phenate | Group II | 22.64 |

As is evident from the results illustrated in Table 6, the trunk piston engine lubricating oil compositions containing a carboxylate-containing detergent exhibited surprisingly better thin film oxidation stability of the test oil, as is evident by their overall higher oxidation induction times, than did the lubricating oil compositions that contained a conventional salicylate-containing detergent, or a combination of conventional sulfonate and phenate detergents. As is further evident from the results, the addition of aminic anti-oxidant to the examples of the invention further improves thin film oxidation stability.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only.

Other arrangements and methods may be implemented by those skilled in the art without departing from the scope and spirit of this invention. Moreover, those skilled in the art will envision other modifications within the scope and spirit of the claims appended hereto.

What is claimed is:

1. A low sulfur marine distillate fuel trunk piston diesel engine lubricating oil composition comprising:
  (a) a major amount of a Group I base oil and/or a Group II base oil;
  (b) a detergent composition comprising:
    (1) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent on an actives basis is from about 100 to 300 mg KOH/g; and
    (2) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent on an actives basis is greater than about 300 mg KOH/g;
  wherein the ratio of weight % medium overbased detergent to weight % high overbased detergent is from about 0.1:1 to 10:1;
  wherein the TBN of the composition is less than 30 mg KOH/g;
  wherein the composition does not contain:
    (i) an overbased detergent comprising a salt of an alkyl-substituted hydroxybenzoic acid having at least 50 mole % of alkyl groups that are $C_{14}$-$C_{18}$; and
    (ii) a detergent comprising sulfurized metal alkyl phenate, and further wherein the composition contains no detergent that does not contain a salt of an alkyl-substituted hydroxybenzoic acid.

2. The lubricating oil composition of claim 1 wherein the ratio of the weight % medium overbased detergent to weight % high overbased detergent is from 1.2:1 to 2.0:1.

3. The lubricating oil composition of claim 1 wherein the alkyl groups in components (1) and (2) are $C_{20}$ to $C_{28}$.

4. The lubricating oil composition of claim 1 wherein the TBN of the medium overbased detergent is 150 to 300 mg KOH/g.

5. The lubricating oil composition of claim 1 wherein the TBN of the high overbased detergent is 325 to 700 mg KOH/g.

6. The lubricating oil composition of claim 1 wherein the TBN of the composition is from 5 to 25 mg KOH/g.

7. The lubricating oil composition of claim 1 wherein the composition comprises an aminic anti-oxidant.

8. The lubricating oil composition of claim 7 wherein the aminic anti-oxidant is selected from the group consisting of diphenylamine, phenyl-alpha-napthyl-amine, N,N-di(alkylphenyl) amines, alkylated phenylene-diamines, alkylated diphenylamine and mixtures thereof.

9. The lubricating oil composition of claim 8 wherein the aminic anti-oxidant is alkylated diphenylamine.

10. The lubricating oil composition of claim 1 wherein the lubricating oil composition comprises a secondary zinc dialkyldithiophosphates selected from the group consisting of zinc dialkyldithiophosphates and zinc diaryldithiophosphates.

11. The lubricating oil composition of claim 1 wherein the composition does not contain a conventional salicylate-based detergent.

12. The lubricating oil composition of claim 1 wherein the composition does not contain a salt of a sulfonic acid or wherein the composition does not contain an alkylphenol detergent, wherein the alkylphenol detergent does not contain a salt of an alkyl-substituted hydroxybenzoic acid.

13. A method for operating a trunk piston engine comprising:
    (a) fueling the engine with a low sulfur marine distillate fuel, and
    (b) lubricating the engine with a lubricating oil composition comprising:
        (1) a major amount of a Group I base oil and/or a Group II base oil;
        (2) a detergent composition comprising:
            (i) a medium overbased detergent comprising an overbased salt of a linear alkyl-substituted hydroxybenzoic acid, wherein at least 90 mole % of the alkyl groups are $C_{20}$ or greater, and wherein the TBN of the medium overbased detergent on an actives basis is from about 100 to 300 mg KOH/g; and
            (ii) a high overbased detergent comprising an overbased salt of a linear alkyl-substituted hydroxybenzoic acid, wherein at least 90 mole % of the alkyl groups are $C_{20}$ or greater, and wherein the TBN of the high overbased detergent on an actives basis is greater than about 300 mg KOH/g;
    wherein the ratio of weight % medium overbased detergent to weight % high overbased detergent is from about 0.1:1 to 10:1;
    wherein the TBN of the composition is less than 30 mg KOH/g;
    wherein the composition does not contain:
        (i) an overbased detergent comprising a salt of an alkyl-substituted hydroxybenzoic acid having at least 50 mole % of alkyl groups that are $C_{14}$-$C_{18}$; and,
        (ii) a detergent comprising sulfurized metal alkyl phenate, and further wherein the composition contains no detergent that does not contain a salt of an alkyl-substituted hydroxybenzoic acid.

14. The method of claim 13 wherein the ratio of the weight % medium overbased detergent to weight % high overbased detergent is from 1.2:1 to 2.0:1.

15. The method of claim 13 wherein the low sulfur marine distillate fuel comprises less than 0.1 wt. % sulfur.

16. The method of claim 13 wherein the alkyl groups in components (1) and (2) are $C_{20}$ to $C_{28}$.

17. The method of claim 13 wherein the TBN of the medium overbased detergent is 150 to 300 mg KOH/g.

18. The method of claim 13 wherein the TBN of the high overbased detergent is 325 to 700 mg KOH/g.

19. The method of claim 13 wherein the TBN of the composition is from 5 to 25 mg KOH/g.

20. The method of claim 13 wherein the composition comprises an aminic anti-oxidant.

21. The method of claim 20 wherein the aminic anti-oxidant is selected from the group consisting of diphenylamine, phenyl-alpha-napthyl-amine, N,N-di(alkylphenyl) amines, alkylated phenylene-diamines, alkylated diphenylamines, and mixtures thereof.

22. The lubricating oil composition of claim 21 wherein the aminic anti-oxidant is alkylated diphenylamines.

23. The method of claim 13 wherein the lubricating oil composition comprises a secondary zinc dialkyldithiophosphates selected from the group consisting of zinc dialkyldithiophosphates and zinc diaryldithiophosphates.

24. The method of claim 13 wherein the composition does not contain a conventional salicylate-based detergent.

25. The method of claim 13 wherein the composition does not contain a salt of a sulfonic acid or wherein the composition does not contain an alkylphenol detergent, wherein the alkylphenol detergent does not contain a salt of an alkyl-substituted hydroxybenzoic acid.

* * * * *